United States Patent [19]
Meissner

[11] Patent Number: 5,707,536
[45] Date of Patent: Jan. 13, 1998

[54] RESIN FILTER CARTRIDGE

[76] Inventor: Christopher A. Meissner, 4181 Calle Tesoro, Camarillo, Calif. 93012

[21] Appl. No.: 582,258

[22] Filed: Jan. 3, 1996

Related U.S. Application Data

[60] Provisional application No. 60/007,341 10/23/95.

[51] Int. Cl.⁶ .................................................. B01D 27/02
[52] U.S. Cl. ........................ 210/807; 210/266; 210/282; 210/288; 210/289
[58] Field of Search ........................ 210/807, 288, 210/289, 291, 266, 282

[56] References Cited

U.S. PATENT DOCUMENTS

| | | | |
|---|---|---|---|
| 2,176,549 | 10/1939 | Smith | 210/266 |
| 4,233,158 | 11/1980 | Wachsmuth | 210/289 |
| 4,966,698 | 10/1990 | Hensley | 210/289 |
| 5,399,264 | 3/1995 | Pulek et al. | 210/450 |
| 5,443,723 | 8/1995 | Stankowski et al. | 213/321.75 |

*Primary Examiner*—Ivars Cintins
*Attorney, Agent, or Firm*—Christie, Parker & Hale, LLP

[57] ABSTRACT

A filter cartridge containing resin beads for purifying fluids such as water and chemicals has a cylindrical housing with an interior compartment containing a fixed septum and a moveable piston-like septum. The resin beads are packed between the fixed septum and the moveable septum. The moveable septum is displaced upstream to account for expansion of the resin beads while the flow of the fluid through the filter cartridge causes the upstream septum to maintain a packing pressure on the resin beads. The downstream fixed septum will preferably have a cone-like shape.

16 Claims, 4 Drawing Sheets

RESIN FILTER CARTRIDGE

This nonprovisional application claims the benefit of my copending provisional application No. 60/007,341 for "RESIN FILTER CARTRIDGE" filed on Oct. 23, 1995, Application No. 60/007,341.

BACKGROUND OF THE INVENTION

Fluids such as water and other chemicals can be purified by passing the fluids through a filter material that binds impurities such as ions or minerals on a molecular level. One type of filter material used for this purpose is in the form of a bed of resin coated beads. Such beads are usually very small, such as 0.020 inches in diameter, and their coatings attract and bind to ions or minerals when fluid goes through the beads.

Resin beads may be contained in cartridges and the fluid to be purified is flowed through the cartridges. The beads swell when they are wetted by the fluid. If a cartridge was completely filled with such beads, it might burst as the beads expanded. Alternatively, if the resin beads are loosely packed, they will tend to swirl when fluid flows through them, which will reduce the "residence time" or length of time the fluid is exposed to the resin beads. Accordingly, the beads may be embedded in a packing material to provide the appropriate packing pressure on the resin beads. The combination of beads and packing material is packed into the filter cartridge. The packing material, however, may contain extractibles, which are chemicals that leach out of the packing material into the fluid. In industries that require ultrapurification of fluids, such as the photoresist industry, extractibles should be limited as much as possible in order to increase the purity of the fluid.

Accordingly, a need exists for a filter cartridge that can contain a filter material such as resin beads and accommodate the expansion of such filter material while reducing the contribution of extractibles to the fluid.

SUMMARY OF THE INVENTION

The present invention provides a filter cartridge for containing a filter material, such as resin beads, for purification of fluids passing through the cartridge. The cartridge has a housing defining a compartment with an inlet and an outlet to permit flow of the fluid through the compartment. An upstream septum and a downstream septum are located within the compartment and are permeable to the fluid but not to the filter material. The upstream and the downstream septums are so located that the fluid must pass through the two septums when the fluid flows from the inlet to the outlet of the compartment. The upstream and the downstream septums are separable so as to define a subcompartment for containing the filter material. At least one of the septums is displaceable within the compartment to accommodate expansion of the filter material yet provide a packing pressure to the filter material to provide an adequate residence time.

In a preferred embodiment of the invention, the housing of the filter cartridge has walls generally parallel to the direction of the fluid through the cartridge and end caps located at either end of the housing. The inlet is a passage through one of the end caps and the outlet is a passage at the other of the end caps. One of the septums is mounted on the end cap defining the outlet passage. The septum is permeable and permits fluid but not filter material to pass through it. The other septum is the form of a piston or plunger located within the compartment defined by the walls of the housing and in sliding contact with those walls so that the plunger septum can move in the compartment between the inlet and outlet end caps. The plunger septum is permeable to the fluid and impermeable to filter material. Filter material such as resin beads may be placed between the plunger septum and the septum affixed to the end cap containing the outlet. The flow of fluid through the filter canister tends to displace the plunger septum toward the outlet end cap and thus provides a packing pressure to the filter material while preventing a filter material from exiting the filter canister through the inlet passage due to any backflow condition. Expansion of the filter material is accommodated by displacement of the plunger septum towards the inlet passage. One of the end caps, preferably the inlet end cap, may be removable so that the filter material may be replaced by washing the used filter material out of the filter canister and adding new filter material.

In a preferred embodiment, the fixed septum has perforated walls aligned at a generally acute angle with respect to the overall direction of fluid flow through the compartment defined by the housing so that the packing pressure of the filter material on the septum produces forces more directed along than perpendicular to the walls of the septum. This result may be achieved if the septum is in the form of a cone or a truncated cone.

A filter cartridge according to the present invention may be mounted in a filter housing in which fluid to be purified enters the filter housing, passes around the exterior of the filter cartridge, through the inlet passage and into the compartment of the housing of the filter cartridge, through the first septum, through the filter material, through the second septum, and then through the outlet passage into an outlet tube exiting the filter housing. Alternatively, an in-line version of the filter cartridge could be connected in-line between an inlet tube and an outlet tube with suitable connectors. An external filter housing could be employed to protect the filter cartridge and keep it secured to connectors for the inlet and outlet tubes.

The filter cartridge according to the invention will work well with resin beads but other filter materials may be employed. The components of the filter cartridge that are in contact with the fluid to be purified may be molded or milled of materials that are low in extractibles so as to avoid adding impurities to the fluid. Examples of materials suitable for construction of the filter cartridge include polypropylene, polyester, and polytetra fluoroethylene (PTFE), polyvinylidene fluoride (PVDF), and perfluoralkoxy fluorocarbon resins (PFA).

An advantage of the filter cartridge according to the invention is that it will contain and allow for expansion of filter materials while contributing fewer extractibles to the fluid being purified.

The invention will be explained and detailed below by description of preferred embodiments as well as drawing figures included with this application.

DETAILED DESCRIPTION OF THE PREFERRED EMBODIMENTS

Figure 1:
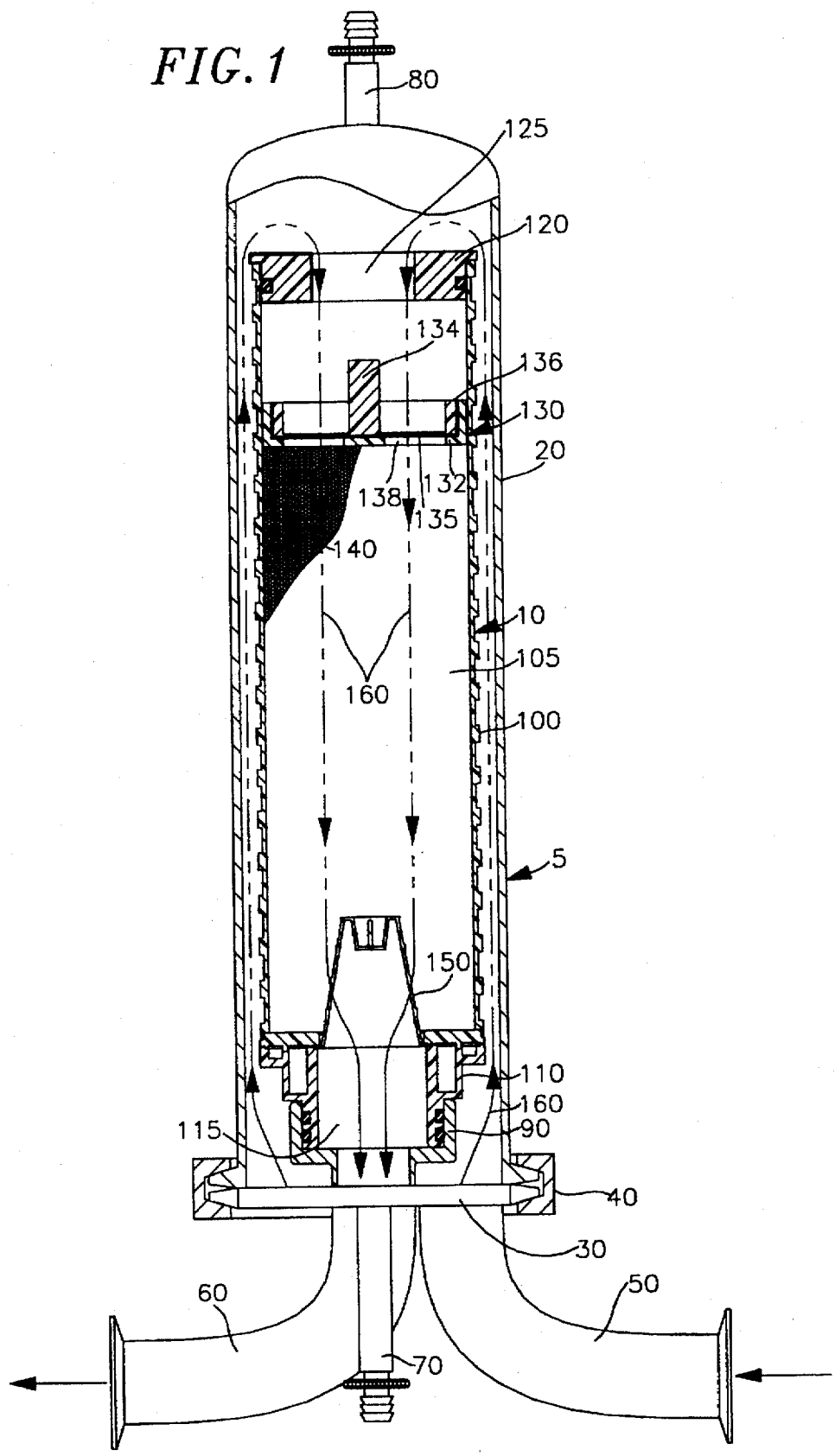
FIG. 1 is a plan view of a filter housing with a partial cut away showing a filter cartridge according to a preferred embodiment of the invention in cross-section.

FIG. 1 shows a filter housing 5 for purifying fluids such as water or chemicals containing a filter cartridge 10 constructed according to a preferred embodiment of the invention. The filter shell 20 and the filter base plate 30 are secured to each other by the clamp 40. The inlet tube 50, which is attached to the filter base plate 30, supplies fluid to be purified into the compartment formed by the filter shell 20 and the filter base plate 30. The outlet tube 60, which is also secured to the filter base plate 30, removes purified fluid from the filter 5. The filter 5 is provided with the vent 70, which attached to filter base 30, and vent 80, which is attached to the filter shell 20. Compressed air may be supplied to the vent 80 to drive fluid out of the filter housing 5 via the drain 70 before unclamping the filter housing 20 from the filter base plate 30 in order to perform maintenance and to replace filter cartridge 10.

The filter cartridge 10 is detachably mounted within the filter housing 5 at the outlet cup 90. The outlet cup 90 is secured to the outlet tube 60 and collects purified fluid exiting the filter cartridge 10 in order to discharge that fluid via the outlet tube 60. Phantom flow lines 160 show the direction of fluid flow through the filter housing 5.

The filter cartridge 10 has a cartridge housing 100 having walls (which are ribbed exteriorly for radial strength) in the form of a cylinder defining a compartment 105. The cartridge housing 100 at this embodiment could be formed in other shapes that also have walls parallel to a major axis running between inlet and outlet, such as a rectangular parallelopiped. The outlet end cap 110 is welded to the end of the cartridge housing 100. The outlet end cap 110 defines an outlet passage 115 which permits egress of fluid which has been purified by the filter cartridge 10. The other end of the cartridge housing 100, in this preferred embodiment, is detachably secured to the inlet end cap 120. The inlet end cap 120 contains the inlet passage 125 which permits fluid to enter the filter cartridge 10. The fluid will flow through the filter cartridge from the inlet passage 125 to the outlet passage 115.

A portion or subcompartment of the compartment 105 is packed with the resin beads 140. These resin beads 140 are secured within the filter cartridge 10 during operation of the filter 5 by two septums. Accordingly, the upstream or plunger septum 130 and a downstream or fixed septum 150 are provided to retain the resin beads in the filter cartridge 10 during operation. The septums 130 and 150 are permeable to the flow of fluid in order to permit fluid to flow through the filter cartridge 10. The septums 130 and 150 are not permeable to the resin beads and therefore secure the resin beads within the filter cartridge 10.

The resin beads 140 are packed into the compartment 105 without any packing material. The resin beads 140 will expand when they are wetted with the fluid that is to be purified. The plunger septum 130, which is in sliding engagement with the walls of housing 100, then will be displaced toward the inlet end cap 120. As fluid flows through the filter cartridge 10, from the inlet passage 125 to the outlet passage 115, the fluid will encounter the plunger septum 130 and urge the plunger septum 130 toward the outlet end cap 110, thereby causing the plunger septum 130 to provide a packing pressure to the resin beads 140 in order to maintain an adequate residence time.

Figure 2:
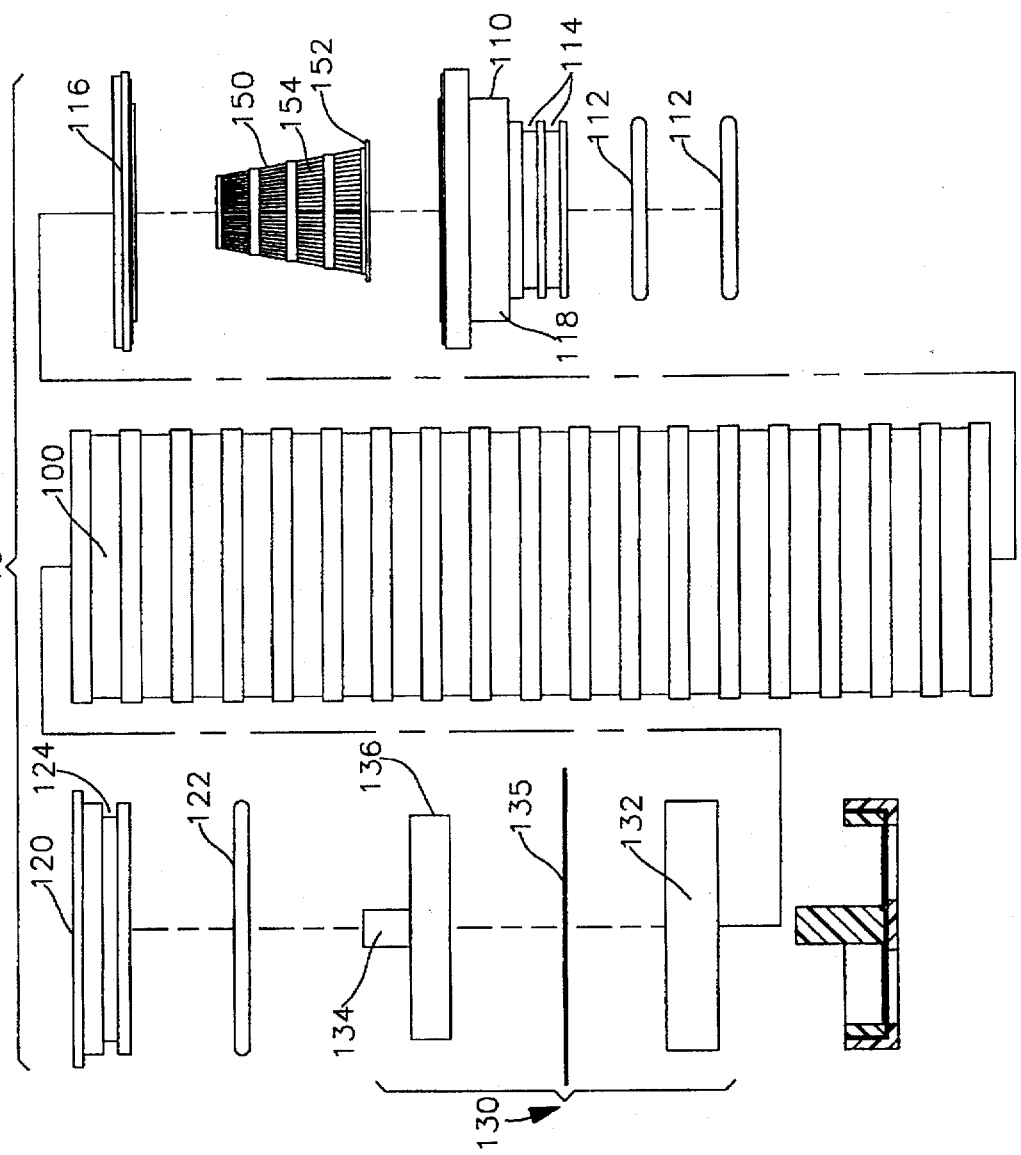
FIG. 2 is exploded plan view of a preferred embodiment of the filter cartridge according to the invention.

FIG. 2 is an exploded view of the filter cartridge 10 showing all of its components (not including the resin beads 140). The inlet end cap 120 has a groove 124 for receiving the O-ring 122. The inlet end cap 120 is removably seated at the top of the housing 100 whereas the outlet end cap 110 is welded to the other end of the housing 100.

The preferred embodiment of the filter cartridge 10 shown in FIGS. 1 and 2 is capable of being reused.

The resin beads contained in the filter cartridge 10 may be removed and replaced when they have lost their efficacy. The inlet end cap 120 is removed from the housing 100 and then the plunger septum 130 is removed by gripping the plunger septum handle 134 and urging the plunger septum 130 out of the housing through the opening previously occupied by the inlet end cap 120. The used resin beads are shaken and washed out of the filter cartridge 10 and replaced with fresh beads, following which the plunger septum 130 is slid into the housing 100 with the plunger septum handle 134 facing away from the resin beads and toward the inlet end cap opening of the housing 100. The inlet end cap 120 is then placed back into position on its end of the housing 100.

The filter cartridge 10 could be supplied without any resin beads so that the customer may load proprietary resin beads. The filter cartridge 10 shown in FIGS. 1 and 2, of course, could be designed so that the inlet end cap 120 is welded to the housing 100, if the customer does not need to reuse the filter cartridge 10 or intend to pack the filter cartridge 10 with the customer's own proprietary resin beads.

The plunger septum 130 is made from a plunger body 132 that has a piston shape with walls that maintain the alignment of the plunger septum 130 in the compartment 105. A screen 135 is secured by force-fitting a locking ring 136 into the plunger body 132. The screen 135 should be permeable to the fluid that is to be purified by the filter cartridge 10 but the apertures in the screen should not be so large as to permit any resin beads to pass through. A plunger septum handle 134 is integrally formed with the locking ring 136.

FIG. 2 also shows the manner in which the fixed septum 150 is secured to the outlet end cap 110. A flange 152 integrally formed with the fixed septum 150 is trapped between the outlet cap locking ring 116 and the outlet end cap connector 118. The outlet end cap locking ring 116 and the outlet end cap connector 118 are welded together to form the outlet end cap 110. The outlet end cap 110 is then welded to the housing 100. All welds should be impermeable to the passage of fluid.

Two radial grooves 114 are integrally formed in the outlet end cap connector 118 to receive the O-rings 112. The O-rings 112 are squeezed between the outlet end cap connector 118 and the outlet cup 90 when the filter cartridge 10 is in operation in the filter housing 5. The resilience of the O-rings 112 prevents leaks of the fluid at the juncture between the outlet end cap connector 118 and the outlet cup 90.

The fixed septum 150, as shown best in FIG. 2, has the appearance of a truncated cone when seen from the side. All fluid exiting the filter cartridge 10 must flow through the parallel slits 154 formed in the sides of the fixed septum 150. The parallel slits 154 are narrow enough to prevent any of the resin beads from exiting the filter cartridge 10. The pressure of the moving fluid and the resin beads will exert forces on the cone-like walls of the fixed septum 150. Because these walls are more parallel than perpendicular to the overall direction of flow of fluid through the filter cartridge 10, the major component of these forces in the walls of the fixed septum 150 will be along the walls rather than perpendicular. The walls of the fixed septum 150 are stronger when forces are exerted on them that are parallel as compared to perpendicular. As a result, the fixed septum 150 can be made of an integrally molded thermoplastic with molded in slits for passage of fluid yet still have adequate strength to resist rupture. The cone shape of the fixed septum 150 also maximizes the surface area of the perforated walls of the fixed septum 150 in order to maximize the flow area of that septum and thus reduce the resistance to flow of the fluid due to the fixed septum 150.

All components of the filter cartridge 10 that are likely to contact the fluid should preferably be molded or milled from an inert thermoplastic. Suitable thermoplastics include polypropylene, polyester, PTFE, PFA, and PVDF. The filter cartridge 10 could be made of other materials that have suitable combinations of inertness or low extractibles, toughness, strength and temperature resistance. Polypropylene is the preferred material because of its possession of these qualities over common ranges of use and its price. Polypropylene components that are to be fixed to each other preferably are welded to avoid the use of glues that might have extractibles which could be released into the fluid that is to be purified.

Figure 3:
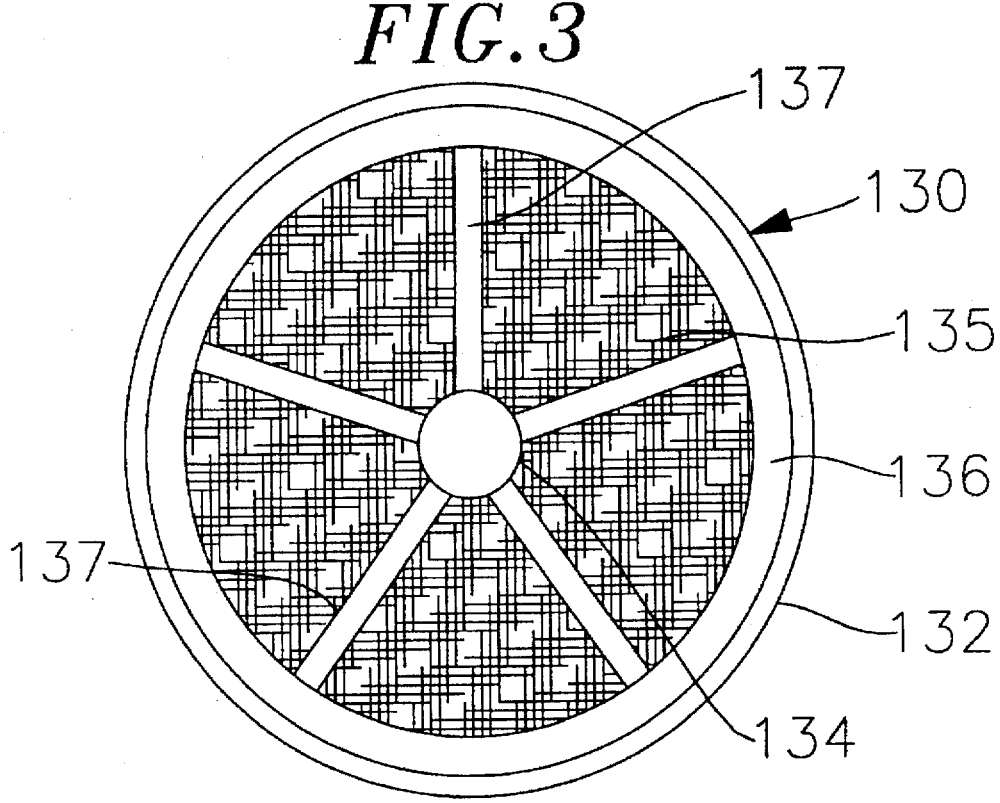
FIG. 3 is a plan view of the top of a plunger septum employed in the preferred embodiments of the invention shown in FIGS. 1, 2, and 5.

FIG. 3 shows the top end view of the plunger septum 130. The screen 135 is best shown in this figure. The preferred material for this screen is a polypropylene mesh but other materials could be used such as poly tetra fluoroethylene. The plunger septum handle 134 and the connecting ribs 137 are integrally molded with the locking ring 136.

Figure 4:
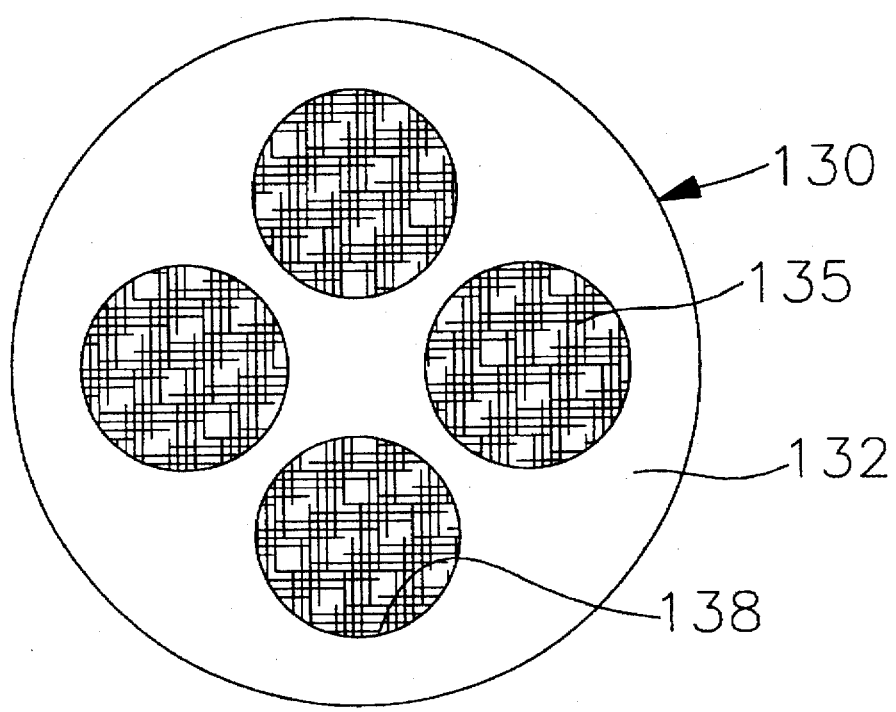
FIG. 4 is plan view of the bottom of the plunger septum of the preferred embodiments of the invention shown in FIGS. 1, 2, and 5.

FIG. 4 shows a bottom end view of the plunger septum 130. The holes 138 are formed in the plunger body so as to permit the fluid to flow through the screen 135 exposed by the holes 138. Other configurations of the plunger septum 130 designed to be permeable to the fluid and impermeable to the resin beads could easily be devised by those skilled in the art.

Figure 5:
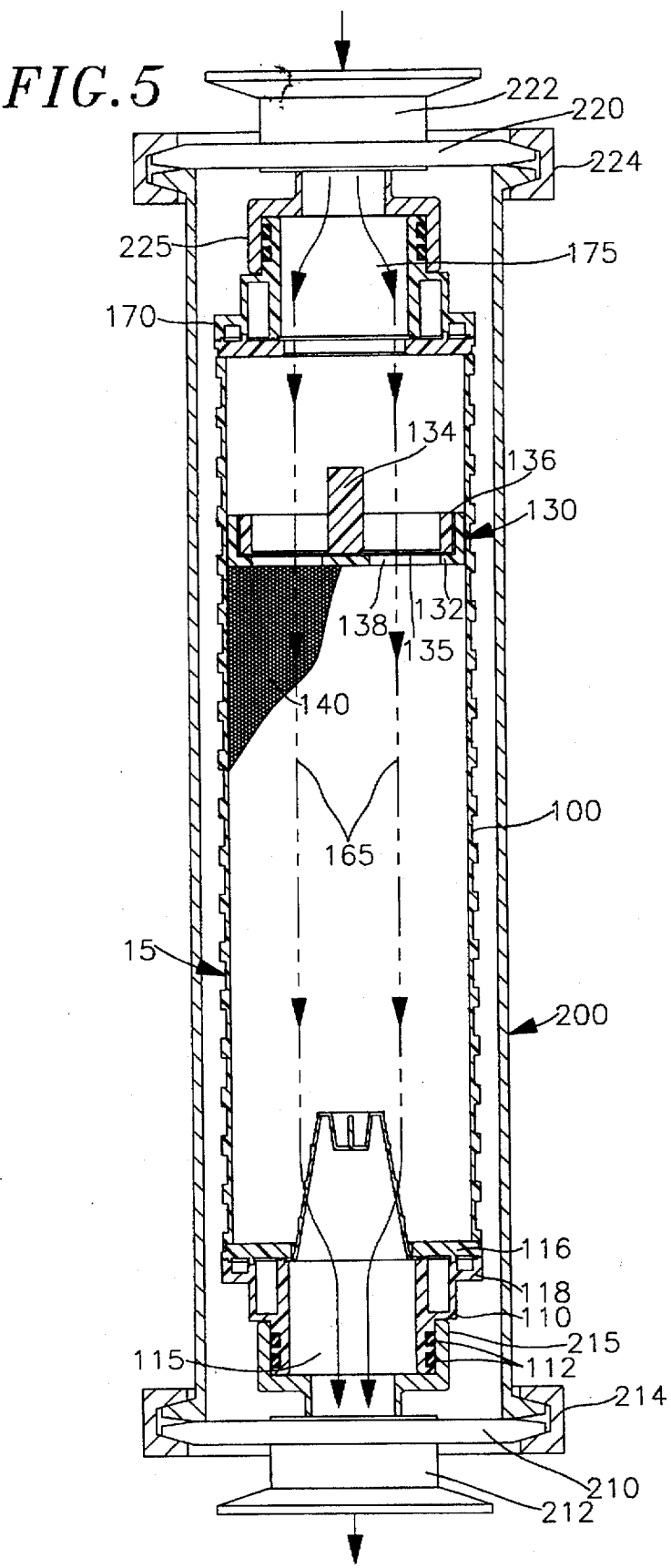
FIG. 5 is a plan view of a filter housing with a partial cut away showing a filter cartridge according to another preferred embodiment of the invention.

FIG. 5 shows the preferred embodiment of an in-line filter cartridge 15 according to the invention.

The in-line filter cartridge 15 is mounted so that the inlet tube 222 directly communicates with the inlet end cap 170 via the inlet cup 225. As indicated by phantom flow lines 165, the fluid will flow directly into the filter cartridge 15 via the inlet passage 175 in the inlet end cap 170, pass through a plunger septum 130 and the resin beads 140, thence through the fixed septum 150 and through the outlet passage 115 of outlet end cap 110 into the outlet cup 215 and thence to the outlet tube 212. Unlike the embodiment shown in FIG. 1, the fluid never passes over the exterior of the housing 100.

The in-line filter housing 200 surrounds the in-line filter cartridge 15 but has the purpose of protecting the in-line filter cartridge 15 and securing it between the inlet cup 225 and the outlet cup 215. The clamps 224 and 214 secure the in-line filter housing 200 to inlet end plates 220 and 210, respectively. The inlet cup 225 is connected to the inlet tube 222 so as to permit the fluid to flow through it into the in-line filter cartridge 15. The end cup 215 is connected to outlet tube 212 so as to permit egress of the fluid from the filter cartridge 15.

The in-line filter cartridge shown in FIG. 5 is not intended to be reusable. Accordingly, the inlet end cup 170 is a duplicate of the outlet end cup 110 and is welded to the housing 100 after the resin beads 140 and plunger septum 130 are loaded into the compartment 105. The inlet end cup 170, however, could be detachably mounted on the housing 100 in the same manner as the inlet end cup 120 is mounted on the housing 100 in FIG. 1, in which case the in-line filter cartridge 15 could be reloaded with resin beads and would therefore be reusable. The in-line filter cartridge, in the latter configuration, could be sold to the customer without the resin beads 140 so that the customer could supply the customer's own proprietary resin beads for use with the in-line filter cartridge 15.

While the invention has been described in detail with respect to certain and preferred embodiments, it should be understood that the invention is not limited to those precise embodiments, and that those embodiments are instead representative examples of the many modifications and variations which present themselves to those skilled in the art to which the invention pertains without departing from the scope and spirit of this invention, as defined in the appended claims.

What is claimed is:

1. A filter cartridge suitable for mounting to a filter housing and containing filter material to purify a fluid passing through the cartridge, comprising:

a cartridge housing having walls defining a compartment and including an inlet end cap defining an inlet passage and an outlet end cap defining an outlet passage to permit flow of the fluid into, through, and out of the compartment;

at least one of the inlet and outlet end caps being adapted to mount to an inlet or an outlet of the filter housing;

an upstream septum and a downstream septum permeable to the fluid but not to the filter material and located within the compartment so that the fluid must pass through the upstream and downstream septums in flowing from the inlet passage to the outlet passage;

the upstream and the downstream septums being separable so as to define a subcompartment in the compartment between the upstream and downstream septums, the subcompartment containing all of the filter material; and one of the septums being displaceable within the compartment to accommodate expansion of the filter material and to provide a packing pressure to all of the filter material contained within the filter cartridge when the fluid is flowing through the compartment.

2. The filter cartridge according to claim 1 in which the downstream septum is fixed.

3. The filter cartridge according to claim 2 in which the downstream septum has walls aligned at an angle with respect to the flow of fluid through the compartment.

4. The filter cartridge according to claim 3 in which the downstream septum has the shape of at least part of a cone.

5. The filter cartridge according to claim 2 in which the downstream septum is attached to the outlet end cap.

6. The filter cartridge according to claim 1 in which the upstream septum moves in sliding engagement with the housing.

7. The filter cartridge according to claim 6 in which the housing has walls that are parallel to a major axis running between the inlet end cap and the outlet end cap and the upstream septum is in piston-like engagement with the walls of the housing.

8. The filter cartridge according to claim 7 in which the housing is cylindrically shaped.

9. The filter cartridge according to claim 6 in which the upstream septum is shaped like a plunger with walls contacting the housing in sliding engagement and maintaining the alignment of the upstream septum in the compartment.

10. The filter cartridge according to claim 1 in which the filter material is comprised of resin beads.

11. The filter cartridge according to claim 1 in which the inlet end cap is detachably secured to the housing to permit removal of the upstream septum and the filter material from the compartment.

12. The filter cartridge according to claim 1 in which the outlet end cap is detachably secured to the housing to permit removal of the downstream septum and the filter material from the compartment.

13. The filter cartridge of claim 1, in which the one, displaceable septum is the upstream septum.

14. A filter cartridge for purifying a fluid passing through the cartridge, comprising:

a cylindrical cartridge housing having walls defining a compartment;

an inlet end cap defining an inlet passage and an outlet end cap defining an outlet passage, the inlet end cap and the outlet end cap being attached at opposed ends of the cartridge housing;

a downstream septum attached to the outlet end cap so that the fluid must pass through the downstream septum in order to pass through the outlet passage, the downstream septum being permeable to the fluid but not to a filter material;

an upstream septum permeable to the fluid but not to a filter material and shaped to fit within the compartment so that the fluid must pass through the upstream septum in order to pass to and through the outlet passage;

filter material packed into the compartment only between the upstream septum and the downstream septum; and the upstream septum being in piston-like engagement with the walls of the cartridge housing and displaceable within the compartment to accommodate expansion of the filter material located between the upstream septum and the downstream septum and to provide a packing pressure to the filter material when the fluid is flowing from the inlet passage to the outlet passage.

15. A method for packing filter material in a cartridge adapted for mounting to a filter housing, the filter cartridge comprising a cartridge housing that defines a compartment and includes an inlet end cap defining an inlet passage, an outlet end cap defining an outlet passage, filter material between the inlet and outlet end caps, at least one of the inlet and outlet end caps being adapted for mounting to an inlet or an outlet of the filter housing, and an upstream and a downstream septum for retaining all of the filter material in a subcompartment in the compartment while permitting passage of a fluid from the inlet passage to the outlet passage through the subcompartment, the method comprising the steps of:

mounting the cartridge in the filter housing;

connecting the filter housing to a fluid line to induce fluid to flow through the filter cartridge; and altering the size of the subcompartment to be occupied by all of the filter material by moving one of the septums toward the corresponding passage in order to permit expansion of the filter material while maintaining a packing pressure on the filter material when the fluid is flowing through the filter cartridge.

16. The method of claim 15, in which the altering step moves the upstream septum toward the inlet passage.

* * * * *